(12) United States Patent
Marshall

(10) Patent No.: US 9,266,450 B2
(45) Date of Patent: Feb. 23, 2016

(54) SEAT FOR ABSORBING A FORCE

(75) Inventor: Neal Marshall, Solihull (GB)

(73) Assignee: Vital Seating & Systems Limited, Brentwood, Essex (GB)

( * ) Notice: Subject to any disclaimer, the term of this patent is extended or adjusted under 35 U.S.C. 154(b) by 0 days.

(21) Appl. No.: 13/261,658

(22) PCT Filed: Nov. 10, 2011

(86) PCT No.: PCT/GB2011/001588
§ 371 (c)(1),
(2), (4) Date: May 16, 2013

(87) PCT Pub. No.: WO2012/066275
PCT Pub. Date: May 24, 2012

(65) Prior Publication Data
US 2013/0229038 A1    Sep. 5, 2013

(30) Foreign Application Priority Data
Nov. 17, 2010    (GB) .................................. 1019468.6

(51) Int. Cl.
*B60N 2/42* (2006.01)
*B60R 21/00* (2006.01)
*B60N 2/427* (2006.01)
*B60N 2/24* (2006.01)
*B60N 2/64* (2006.01)
*B60N 2/68* (2006.01)
*B64D 11/06* (2006.01)
*B64D 25/04* (2006.01)

(52) U.S. Cl.
CPC .............. *B60N 2/42709* (2013.01); *B60N 2/24* (2013.01); *B60N 2/4242* (2013.01); *B60N 2/646* (2013.01); *B60N 2/686* (2013.01); *B64D 11/06* (2013.01); *B64D 11/0619* (2014.12); *B64D 25/04* (2013.01); *B60N 2/427* (2013.01); *B60N 2/4207* (2013.01); *B60N 2/4221* (2013.01); *B60N 2/4228* (2013.01)

(58) Field of Classification Search
CPC .. B60N 2/4221; B60N 2/4228; B60N 2/4207; B60N 2/4242; B60N 2/686
USPC ............... 297/216.1, 216.16, 216.17, 216.18, 297/216.19
See application file for complete search history.

(56) References Cited

U.S. PATENT DOCUMENTS

| | | | | |
|---|---|---|---|---|
| 2,940,511 A * | 6/1960 | Gomes | ...................... | 297/440.12 |
| 3,819,232 A * | 6/1974 | Wagner | ..................... | 297/452.21 |
| 3,967,852 A | 7/1976 | Eiselt et al. | | |
| 4,036,527 A * | 7/1977 | Faul | .......................... | 297/452.39 |
| 4,368,917 A * | 1/1983 | Urai | ........................... | 297/452.54 |
| 4,509,796 A * | 4/1985 | Takagi | ...................... | 297/452.55 |
| 4,555,140 A * | 11/1985 | Nemoto | .................... | 297/452.54 |
| 4,883,320 A * | 11/1989 | Izumida et al. | .......... | 297/452.56 |

(Continued)

FOREIGN PATENT DOCUMENTS

| | | |
|---|---|---|
| DE | 195 46 646 | 6/1996 |
| DE | 198 03 784 | 7/1999 |
| EP | 0 443 057 | 8/1991 |

*Primary Examiner* — Chi Q Nguyen
(74) *Attorney, Agent, or Firm* — Iandiorio Teska & Coleman, LLP

(57) ABSTRACT

A seat (2) for absorbing a force, which seat (2) comprises a seat pan (4) having a folded portion (6), the folded portion (6) being such that it unfolds consequent upon receiving the force and thereby absorbs at least a part of the force. The force may be a blast from a mine, or the force of an aeroplane or helicopter striking the ground.

18 Claims, 2 Drawing Sheets

(56) References Cited

U.S. PATENT DOCUMENTS

| | | | |
|---|---|---|---|
| 5,022,709 A * | 6/1991 | Marchino | 297/452.24 |
| 5,168,615 A * | 12/1992 | Koa | 29/91.1 |
| 5,662,376 A * | 9/1997 | Breuer et al. | 297/216.2 |
| 6,896,324 B1 * | 5/2005 | Kull et al. | 297/216.1 |
| 7,490,899 B2 * | 2/2009 | McMillen | 297/284.1 |
| 7,878,589 B2 * | 2/2011 | Murakami et al. | 297/284.11 |
| 8,146,988 B2 * | 4/2012 | Mowry et al. | 297/216.1 |
| 2006/0055214 A1 * | 3/2006 | Serber | 297/216.1 |
| 2008/0231092 A1 * | 9/2008 | Silva | 297/216.13 |
| 2010/0270836 A1 * | 10/2010 | Mowry et al. | 297/216.19 |

* cited by examiner

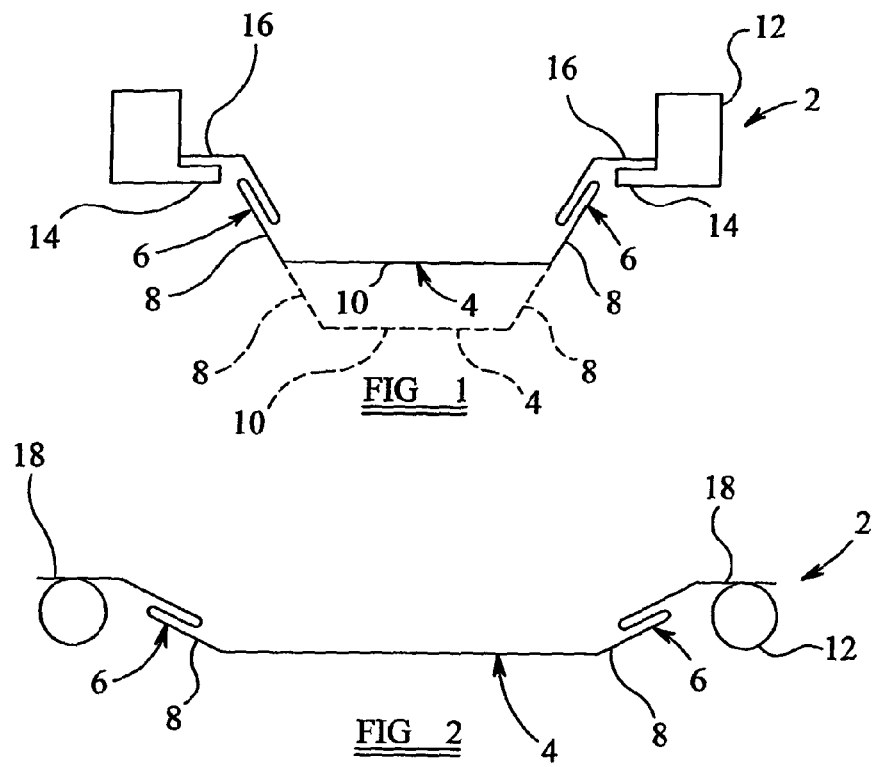
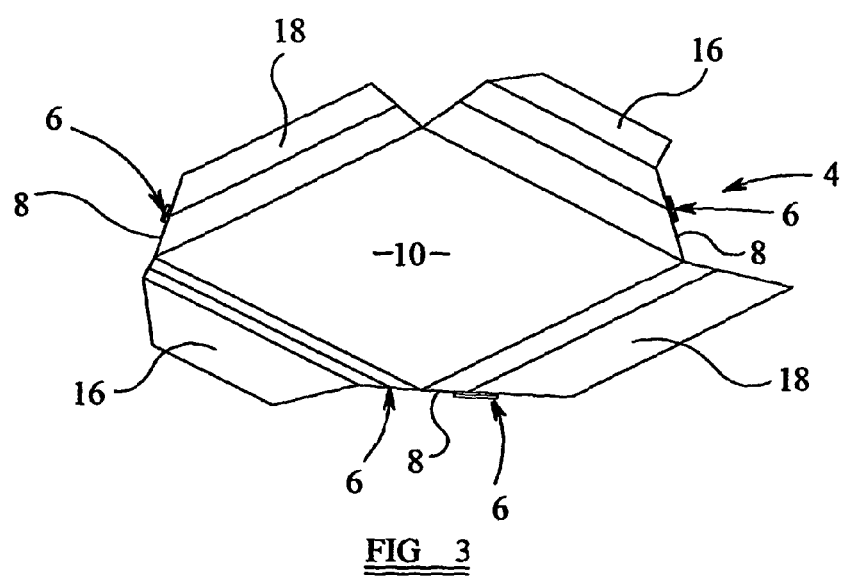

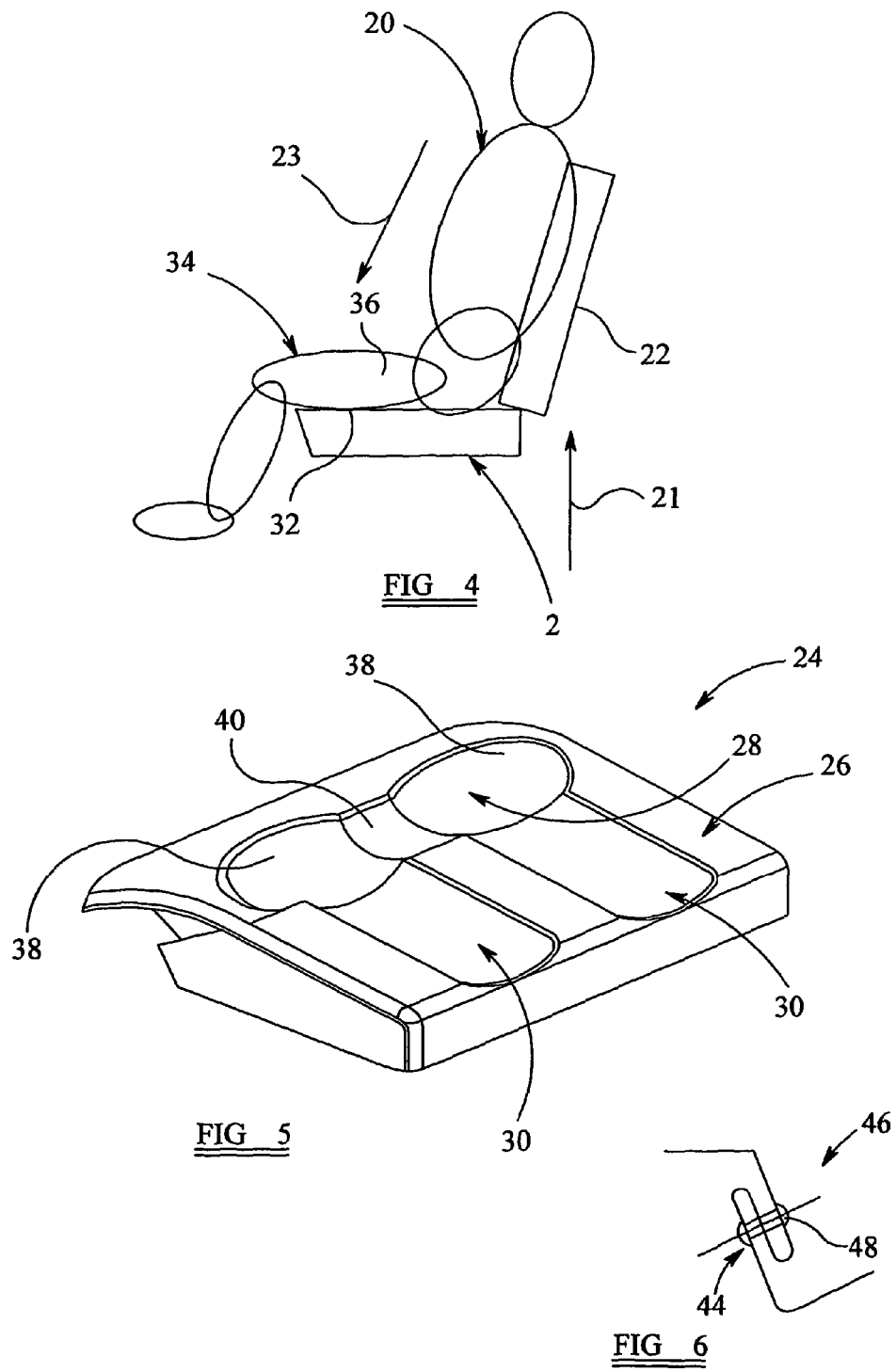

SEAT FOR ABSORBING A FORCE

BACKGROUND OF THE INVENTION

This invention relates to a seat and, more especially, this invention relates to a seat for absorbing a force. The seat may absorb a force from, for example, a blast from a mine, or a crash from an aeroplane or a helicopter.

Vehicles travelling in areas of conflict throughout the world are often subject to mine blasts. The conflicts may be wars or simply acts of terrorism. The vehicles may be military vehicles or civilian vehicles. The mines may be properly constructed mines of the type used by armies, or the mines may be improvised explosive devices of the type used by terrorists. Irrespective of the type of vehicle or the type of mine, people travelling in vehicles which are blown up by mines often suffer loss of life or severe injuries including loss of limbs and/or spinal damage. An initial blast from a mine will act upwardly and may blow a vehicle upwardly and into the air. A second damaging force acts downwardly and occurs when the vehicle strikes the ground after having been blown upwardly into the air. This second force is sometimes referred to as a slam-down force.

Aeroplanes and helicopters rarely crash, but nevertheless crashes do happen. The downward force during a crash is unusually substantial but there are occurrences, especially with helicopters, when the downwards force is not so great that all occupants are killed. In this case, the occupants may suffer serious injuries due to the downward force of the crash.

SUMMARY OF THE INVENTION

It is an aim of the present invention to reduce the above mentioned problem.

Accordingly, the present invention provides a seat which is constructed to absorb a force of a magnitude that would kill or injure an occupant of said seat, said seat comprises a seat pan having a folded portion and being a part of the seat which is sat on; the folded portion unfolds and permanently deforms consequent upon receiving the force and thereby absorbs at least a part of the force; the seat pan is made of sheet material and the folded portion is formed solely by folding of the sheet material; and the unfolded portion is unable to return to a non-deformed state after having been permanently deformed.

The seat of the present invention is advantageous in that lives may be saved and injuries, and especially spinal injuries, may be avoided or minimised due to the unfolding of the folding portion of the seat. The provision of the folded portion is able to be accomplished inexpensively and unobtrusively. Thus manufacturing costs are able to be minimised, whilst at the same time maximising upon the ability of the seat to save lives and injury.

The seat may be one in which the folded portion is configured to unfold in a downward direction. This unfolding in the downward direction is able to absorb the force, for example from the blast from the mine as a result of a vehicle hitting the ground after being blown up by the mine, or from an aeroplane or helicopter striking the ground in a crash. The folded portion could alternatively or additionally be configured to unfold in an upward direction in order to absorb an upwards force, for example from a mine and which would tend to force the vehicle upwards.

The folded portion preferably extends back on itself twice. Such a folded portion may be regarded as an S-folded portion, or what is sometimes called as a Dutch folded portion. The folded portion may have more or less than two folds if desired.

Preferably, the folded portion extends all around the seat pan. If desired however the folded portion may extend only partially around the seat pan.

The seat may be one in which the folded portion includes fold retainer means which helps to retain the folded portion in shape until the seat receives the force. The fold retainer means may comprise at least one rivet, for example a pop rivet. More than one rivet may be employed if desired. Other type of fold retainer means may be employed. The fold retainer means may be such that it pulls away from the folded portion or otherwise allows the folded portion to unfold.

Preferably, the seat is one in which the seat pan comprises side walls and a base, and in which the folded portion is positioned in the side walls. Other positions for the folded portion may be employed. Preferably the side walls slope outwardly from the base. Such a construction may help to deflect the force of a mine blast away from a person on the seat.

Preferably, the seat pan is made of sheet material. The sheet material will usually be sheet metal. Any suitable and appropriate sheet metal may be employed including steel, tin and aluminum.

The seat may be one in which the seat pan is attached to a seat frame. The seat frame may be a box frame. Other types of seat frame may be employed.

The seat may be one in which the seat comprises a seat portion which is sat upon, and in which the seat portion which is sat upon comprises a first recessed area for receiving a person's buttocks, and a pair of second recessed areas for receiving a part of the person's legs underneath their thighs.

The first recessed area may comprise two recessed portions, one for each buttock. The two recessed portions may be joined to each other, or they may be separate from each other.

The seat portion may be a hard seat portion made of a hard material. The hard material may be a metal, for example the same as is used for the rest of the seat or for part of the seat. Alternatively, the seat portion may be a soft seat portion made of one or more foam materials.

The seat may include a backrest portion. Alternatively, the seat may be a backless seat.

The present invention also extends to a vehicle when provided with the seat.

The vehicle may be a military vehicle such for example as an all terrain vehicle, a lorry, a personnel carrier or a tank. Alternatively, the vehicle may be a civilian vehicle such for example as a bus, coach, taxi or car. Alternatively, the vehicle may be an aircraft such for example as an aeroplane or a helicopter.

BRIEF DESCRIPTION OF THE DRAWINGS

Embodiments of the invention will now be described solely by way of example and with reference to the accompanying drawings in which:

FIG. 1 is a section on a line extending from front to back of part of a first seat of the present invention;

FIG. 2 is a section on a line extending from side to side of the part of the seat as shown in FIG. 1;

FIG. 3 is a perspective view of a part of the seat part shown in FIGS. 1 and 2;

FIG. 4 is a side view of a seat having the parts shown in FIGS. 1, 2 and 3;

FIG. 5 shows part of a second seat of the present invention; and

FIG. 6 shows the use of fold retainer means.

DETAILED DESCRIPTION OF THE DRAWINGS

Referring to FIGS. 1-4, there is shown a seat 2 for absorbing force from a blast from a mine. The seat 2 comprises a seat pan 4 having a folded portion 6. The folded portion 6 is such that it unfolds consequent upon receiving a blast from the mine and thereby absorbs force from the blast.

The folded portion 6 is configured to unfold in a downward direction as can best be appreciated from FIG. 1. More specifically, FIG. 1 shows in solid lines the seat pan 4 and the folded portion 6. FIG. 1 shows in broken lines the seat pan 4 after the folded portion 6 has unfolded. The seat 2 is positioned in a vehicle at a height above a floor or other support surface in the vehicle such that the folded portion 6 is able to unfold, and thus the seat pan 4 is able to deform to the position shown in the broken lines in FIG. 1.

The seat 2 is such that the folded portion 6 extends all around the seat pan 4. The seat pan 4 comprises side walls 8 and a base 10. The folded portion 6 is in the side walls 8. As shown in FIGS. 1, 2 and 3, the side walls 8 slope outwardly from the base 10. This helps to minimise the initial upward force from a blast from a mine.

The seat pan 4 is made of sheet metal. The seat pan 4 is attached to a seat frame 12. The seat frame 12 is a box seat frame. The part of the seat frame 12 shown in FIG. 1 is of a basic rectangular construction with a lip 14 for supporting peripheral edges 16 of the seat pan 4. The part of the seat frame 12 shown in FIG. 2 is of circular cross section and peripheral edges 18 of the seat pan 4 extend over these parts and are secured to the parts as shown. The securing of the peripheral edges 16, 18 to the seat frame 12 can be by any suitable and appropriate securing means including rivets and welding.

FIG. 4 shows a person 20 sitting in the seat 2. The seat 2 is shown schematically as being provided with a backrest portion 22. An arrow 21 shows the initial upward force from a mine blast. An arrow 23 shows the secondary downward force which acts on the person 20.

FIG. 5 is a plan view of part of a second seat 24 of the invention. The seat 24 has the features of the seat 2 shown and described above with reference to FIGS. 1-3. In addition, the seat 24 has a seat portion 26 which is sat upon, for example by the person 20. The seat portion 24 comprises a first recessed area 28 for receiving a person's buttocks, and a pair of second recessed areas 30 for receiving a part 32 of the person's legs 34 underneath their thighs 36. The recessed area 28 comprises two recessed portions 38, one for each buttock of the person 20. The recessed portions 38 are connected by a recessed portion 40.

Referring to FIG. 6, there is shown a folded portion 44 of a seat 46. The folded portion 44 is provided with fold retainer means 48 which helps to retain the folded portion 44 in shape until the seat 46 receives the force. The fold retainer means 48 is shown in the form of a pop rivet. When the seat 46 receives the force, then the pop rivet falls out of the folded portion 44 to allow the folded portion 44 to unfold and thereby absorb at least a part of the force on the seat 46.

The use of the folded portion enables the seat of the present invention to have a seat architecture which collapses in a controlled way under high vertical and off-vertical events. This may help to deflect the force, and it may also help to decelerate the occupant of a seat to safe levels. The unfolding of the folded portion enables the seat pan to drop, for example by a distance of 40-60 mm.

It is to be appreciated that the embodiments of the invention described above with reference to the accompanying drawings have been given by way of example only and that modifications may be effected. Thus, for example, the seat pan 4 and the folded portion 6 may be different from those shown. The seat may be a backless seat. The seat may be an individual seat or a bench-type seat. Where the seat is on an individual seat, then it may be a separate seat or it may be connected to other seats. The seat 2 may alternatively be in an aeroplane or helicopter, in which case the folded portion 6 will operate if the aeroplane or helicopter crashed to the ground. Individual components shown in the drawings are not limited to use in their drawings and they may be used in other drawings and in all aspects of the invention.

The invention claimed is:

1. A seat which is constructed to absorb a force of a magnitude that would kill or injure an occupant of said seat, said seat comprises a seat pan having a folded portion and being a part of the seat which is sat on; the folded portion unfolds and permanently deforms consequent upon receiving the force and thereby absorbs at least a part of the force; the seat pan is made of sheet material and the folded portion is formed solely by folding of the sheet material; and the folded portion is unable to return to a non-deformed state after having been permanently deformed.

2. A seat according to claim 1 wherein the folded portion is configured to unfold in a downward direction.

3. A seat according to claim 2 wherein the folded portion is S-shaped in cross section.

4. A seat according to claim 1 wherein the folded portion extends all around the seat pan.

5. A seat according to claim 1 wherein the folded portion includes fold retainer means which helps to retain the folded portion in shape until the seat receives the force.

6. A seat according to claim 5 wherein the fold retainer means comprises at least one rivet.

7. A seat according to claim 1 wherein the seat pan comprises side walls and a base, and in which the folded portion is positioned in the side walls.

8. A seat according to claim 7 wherein the side walls slope outwardly from the base.

9. A seat according to claim 1 wherein the sheet material is sheet metal.

10. A seat according to claim 1 wherein the seat pan is attached to a seat frame.

11. A seat according to claim 10 wherein the seat frame is a box frame.

12. A seat according to claim 1 wherein the seat comprises a seat portion which is sat upon, and in which the seat portion which is sat upon comprises a first recessed area for receiving buttocks of a person, and a pair of second recessed areas for receiving part of legs of the person underneath thighs of the person.

13. A seat according to claim 12 wherein the first recessed area comprises two recessed portions, one for each buttock.

14. A seat according to claim 12 wherein the seat portion is a hard seat portion made of a hard material.

15. A seat according to claim 12 wherein the seat portion is a soft seat portion made of one or more foam materials.

16. A seat according to claim 1 and including a backrest portion.

17. A seat according to claim 1 wherein the seat is a backless seat.

18. A vehicle when provided with a seat according to claim 1.

* * * * *